June 23, 1964  J. GACHOT  3,137,935
METHODS OF PRODUCING GASKETS
Filed June 8, 1961  2 Sheets-Sheet 1

INVENTOR
JEAN GACHOT
By Irwin S. Thompson
ATTY.

June 23, 1964 J. GACHOT 3,137,935
METHODS OF PRODUCING GASKETS
Filed June 8, 1961 2 Sheets-Sheet 2

INVENTOR
JEAN GACHOT
By Irwin S. Thompson
ATTY.

United States Patent Office 3,137,935
Patented June 23, 1964

3,137,935
METHODS OF PRODUCING GASKETS
Jean Gachot, 179 Ave. de la Division Leclerc,
Enghien, France
Filed June 8, 1961, Ser. No. 115,637
Claims priority, application France Oct. 10, 1960
2 Claims. (Cl. 29—450)

This invention relates to a method of producing a gasket of annular type comprising a flexible core externally covered by a protective casing. This method is applied more particularly when the material used for the gasket core is a plastic material which is not adapted to be welded to itself, such as polytetrafluoroethylene. It is known that for a resin such as polytetrafluoroethylene, of the kind available on the market in the shape of rods, tubes and the like, even if two parts thereof are heated, joined and pressed one against another, the two parts cannot be bound together. Such substances will be hereinafter referred to as being not adapted to be welded to itself, in contrast for instance to thermoplastic resins. In this art it is known to make an annular gasket comprising a core formed by a rubber ring or a ring of any other flexible composition, said core being covered on its two bearing faces by the flanges of a double collar of polytetrafluoroethylene. Gaskets of this kind are very advantageous because of the resistance of this substance to corrosive agents and its satisfactory performane at elevated temperatures.

In certain cases however, when the gasket core is of a small width, the behavior of the collars may leave much to be desired. Furthermore, the outer part of the gasket core cannot be protected by the collars, since the material of the latter cannot be welded to itself. It is not therefore possible to make a fully covered core. As a result, the gasket core may come into contact with corrosive agents if there are slight defects in sealing, and this entails damage to the gasket, sooner or later.

The improvements provided by the present invention enable these disadvantages to be obviated while permitting the production of gaskets which have completely protected cores, even if the covering material is not adapted to be welded to itself.

According to the invention, the method of producing gasket comprising an annular core housed in a casing of a flexible synthetic material not adapted to be welded to itself, such as polytetrafluoroethylene, comprises forming with the material of the casing a bellows element comprising two opposite folds and three flanks, the width of which is slightly greater than that of the core, whereupon the annular core is introduced into the housing formed by two consecutive flanks of the bellows, and then the third flank is passed into the central opening of the preceding assembly and is folded over in this opening, whereupon the turning over of this flank is continued so as to bring it on to the first flank of the bellows, bearing on the annular core which is then completely imprisoned in the protective casing thus formed. The three-flank bellows of plastic material required to form the casing for the gasket may be obtained by successively cutting out from a tube of plastic material, the thickness of which corresponds to the required width of the flanks of the bellows.

A specific embodiment of the invention will now be described by way of example with reference to the accompanying drawings, in which:

FIGS. 2, 3 and 4 are partial diametrical sectional views showing the subsequent phases of the method above referred to.

The first stage of the process of the invention comprises making a bellows element having two opposite folds and three consecutive flanks, in other words a Z-shaped section.

Figure 1:
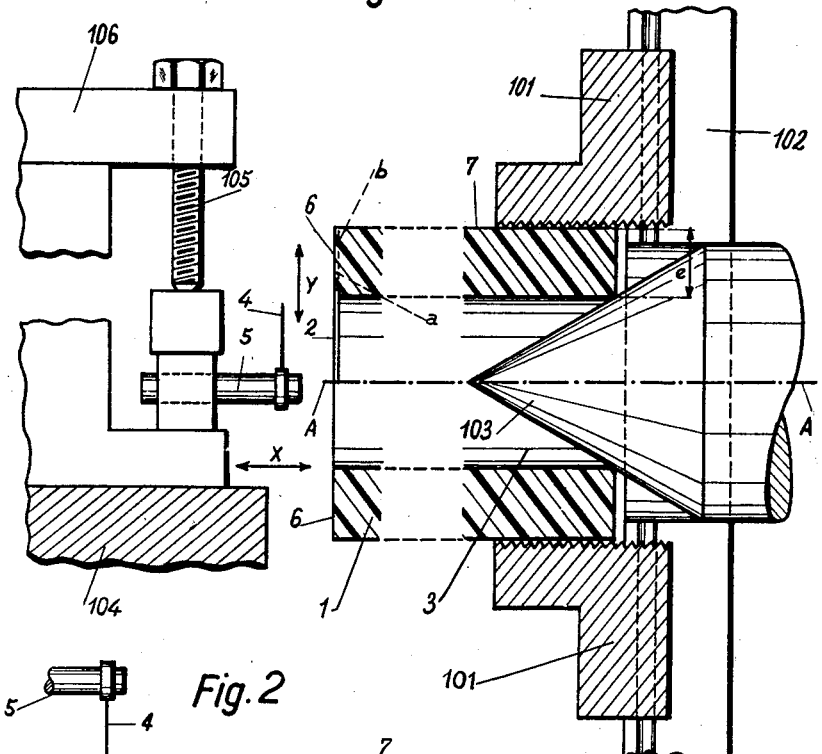
FIG. 1 is an elevational view partly in diametrical section, showing a tube supported relative to a lathe mandrel before performing the first phase of the method for manufacturing a bellows element intended for providing the gaskets of the invention.

For this purpose, the procedure is as follows. A tube 1 (FIG. 1), for example of polytetrafluoroethylene, the thickness $e$ of which is equal to the maximum width of the flanks of the bellows, is used to start with.

One of the flanks of the bellows which preferably is to have a smaller width is formed by first cutting a groove 2 in the tube 1, the depth of said groove corresponding to the thickness required for the flank of the bellows.

For this operation, the tube 1 may be positioned over a lathe mandrel. The groove is formed by the usual means.

Afterwards, the cutting-out operations are undertaken. For this purpose (FIG. 1) the tube 1 is fastened between jaws 101 of the rotatable chuck or plate 102 of a lathe, of which the rotating axis is shown by line A—A, the center 103 of the lathe being engaged in the opening 3 of tube 1.

The cutting tool 4 which comprises a thin steel cutting blade is carried by a support 5 fitted on the tool-holder carriage 104 of the lathe by means of a tightening screw 105 fastened on a bracket 106 borne by said carriage 104.

By well-known means, the carriage 104 and consequently the tool 4 may receive a translation movement in a direction X—X parallel to the axis A—A or in a direction Y—Y perpendicular to said axis A—A.

By moving the carriage in the directions X—X and then Y—Y, the operator introduces the blade 4 into the opening 3 of the tube 1.

The cutting edge of the blade 4, directed towards the exterior, is introduced gradually into the wall of tube 1 which is rotated about its axis by plate 102. The thickness of the tube 1 is then cut along a line $a$—$b$ parallel to the end face 6 of the tube 1 and continuing the groove 2. The procedure is such that during this stage, and the same applies to the following stages, there is no tearing of the material, but simply cutting, no chips being formed.

Cutting of the tube 1 is stopped at a certain distance from the outer surface 7 of the latter. In this way the first flank $f_1$ of the bellows is formed.

Figure 2:
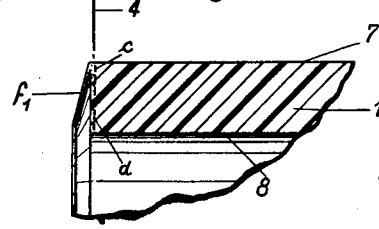

Then the operator moves the carriage 104 to bring the blade 4 to the outside of tube 1, its cutting end being directed towards axis A—A (FIG. 2).

A new section of the tube 1 is then cut along a line $c$—$d$, cutting being stopped at a certain distance from the inner surface 8 of the tube. The flank $f_2$ of the bellows is then formed.

Figure 3:
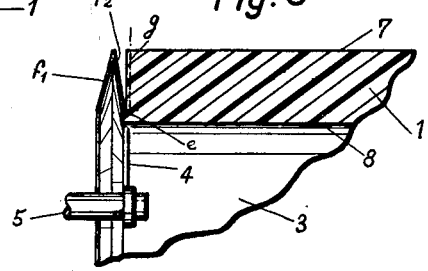

The tool 4 is reintroduced into the opening 3 and another section of the tube is cut along a line $e$—$g$, care being taken this time completely to cut off the third flank $f_3$ thus formed (FIG. 3).

Figure 4:
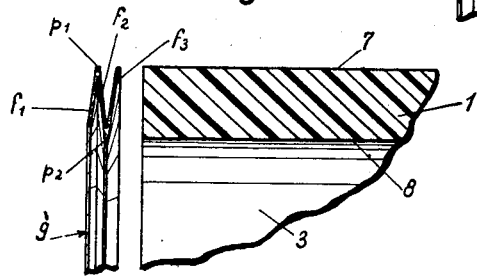

A bellows 9 (FIG. 4) is then obtained which comprises three consecutive flanks $f_1$, $f_2$, $f_3$, separated by two opposite folds $p_1$, $p_2$.

This bellows, which thus has a Z-shaped cross-section, forms the gasket covering.

For the above machining processes, it is of course possible for the various stages to be carried out either by leaving the tube 1 on one and the same machine and adjusting the position of the tool 4 or by moving the tube 1 to pre-set tools of successive machines.

Figure 5:
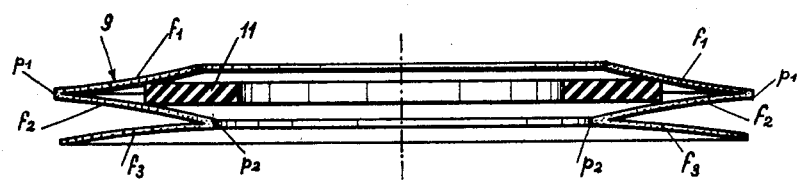
FIGS. 5, 6 and 7 are larger-scale views in axial section and in elevation, showing the successive stages of fitting the aforesaid bellows element to the annular core of the gasket.

For the assembly of the actual gasket (FIG. 5) the annular core 11, which, for example, is made of a flexible and resilient material, is put into position by housing it in the bifrusto-conical surface formed by the flanks $f_1$—$f_2$ of the bellows 9.

Figure 6:
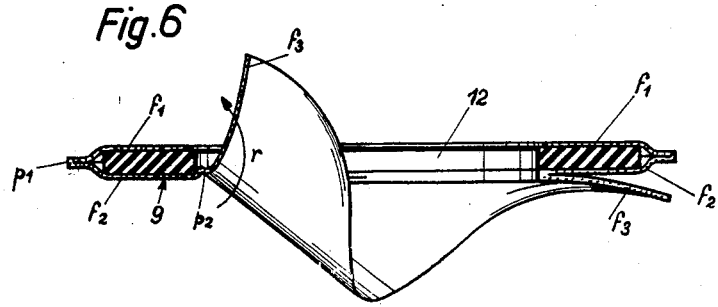

The flank $f_3$ is then folded over (in the direction $r$) into the central opening 12 which is left free (FIG. 6) and this movement is continued over the entire contour of the gasket. This folding-over operation is possible as a result of the flexibility of the material of the bellows 9 in view of its small thickness.

Figure 7:
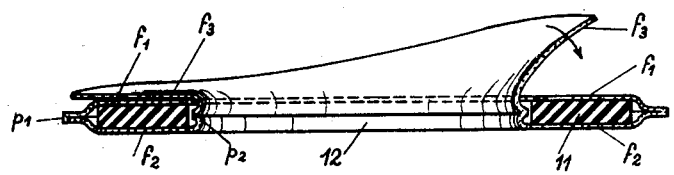

Turning over of the flank $f_3$ is continued (FIG. 7) so as to bring it into contact with the flank $f_1$, which already bears on the core 11. It will then be found that core 11 is completely enclosed in the annular casing formed by the flanks $f_1$, $f_2$, and $f_3$.

Figure 8:
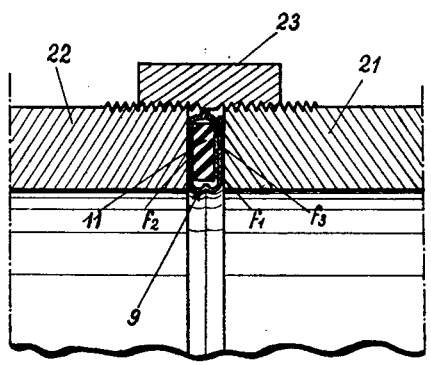
FIG. 8 is a partial axial sectional view showing a gasket according to the invention fitted between two pipe elements.

The core 11 of the gasket thus formed is well adapted to withstand the action of corrosive agents. In fact, once the gasket has been put into position, for example between two piping elements 21, 22 (FIG. 8) joined by a clamping ring 23, the two flanks $f_1$, $f_3$, are held in contact with one another. The path that the fluid would have to cover to come into contact with the core 11 is practically equal to twice the width of this core. This means that the casing thus formed is sealing-tight, thus giving excellent protection of the gasket.

What I claim is:

1. A method for manufacturing gaskets which comprise an annular core having two parallel side faces and housed in a one-piece casing of a flexible synthetic material not adapted to be welded to itself, such as polytetrafluoroethylene, said casing having one intermediate flank in contact with one of said core side faces, and two other flanks attached thereto in overlapping relationship on the other one of said side faces of said core, said method comprising forming with the material of the casing a tubular bellows with a Z-shaped cross section comprising two opposite folds and three substantially radially extending flanks the width of which is slightly greater than that of the core, introducing said annular core into the fold of the casing open toward the bore of the bellows and formed by two consecutive flanks of said bellows thereby forming an annular assembly having a central opening therein, introducing the third flank of said casing into said central opening by folding it over and continuing the turning over of said flank until it is brought in overlapping position onto said first flank of said casing which bears against said core.

2. A method for manufacturing gaskets which comprise an annular core having two parallel side faces and housed in a one-piece casing of a synthetic flexible material not adapted to be welded to itself, such as polytetrafluoroethylene, said casing having one intermediate flank in contact with one of said core side faces and two other flanks attached thereto in overlapping relationship on the other one of said core side faces, said method comprising forming said casing by successive circular cutting operations upon a plastic tube the thickness of which substantially corresponds to the required width of the bellows flanks, said cutting operations consisting of one radially incomplete circular cutting from the interior of the tube, one radially incomplete circular cutting from the exterior of the tube and one complete circular cutting again from the interior of the tube, thereby obtaining a tubular bellows with a Z-shaped cross section comprising two opposite folds and three substantially radially extending flanks the width of which is slightly greater than that of the core, introducing said annular core into the fold of the casing open toward the bore of the bellows and formed by two consecutive flanks of said bellows thereby forming an annular assembly having a central opening therein, introducing the third flank of said casing into said central opening by folding it over and continuing the turning over of said flank until it is brought in overlapping position onto said first flank of said casing which bears against said core.

References Cited in the file of this patent

UNITED STATES PATENTS

| | | |
|---|---|---|
| 1,926,628 | Morehouse | Sept. 12, 1933 |
| 2,263,815 | Northup et al. | Nov. 25, 1941 |
| 2,459,720 | Poltorak | Jan. 18, 1949 |
| 2,459,721 | Poltorak | Jan. 18, 1949 |
| 2,580,546 | Hobson | Jan. 1, 1952 |
| 2,597,976 | Cousins | May 27, 1952 |
| 2,859,061 | Reid | Nov. 4, 1958 |
| 2,868,575 | Hawxhurst | Jan. 13, 1959 |
| 2,924,008 | Haushalter | Feb. 9, 1960 |